United States Patent [19]

Rohs

[11] Patent Number: 5,687,827

[45] Date of Patent: Nov. 18, 1997

[54] CLUTCH WITH TANGENTIAL SPRING BODIES

[75] Inventor: Ulrich Rohs, Düren, Germany

[73] Assignee: Patentverwertungsgesellschaft Rohs Voight mbH, Düren, Germany

[21] Appl. No.: 568,943

[22] Filed: Dec. 7, 1995

[30] Foreign Application Priority Data

Dec. 19, 1994 [DE] Germany .............. 44 45 257.8

[51] Int. Cl.$^6$ .................. F16D 13/64; F16D 3/14
[52] U.S. Cl. .............. 192/211; 192/209; 464/27; 464/85
[58] Field of Search .................. 192/211, 209, 192/210, 210.1, 55.6, 55.4, 208; 464/85, 27, 24; 267/141.2, 141, 141.3, 153

[56] References Cited

U.S. PATENT DOCUMENTS

| | | | |
|---|---|---|---|
| 2,513,379 | 7/1950 | Thelander | 464/27 X |
| 2,964,930 | 12/1960 | Aira | |
| 3,386,265 | 6/1968 | Kasaback | 192/209 X |
| 3,504,901 | 4/1970 | Ditty | 267/141 X |
| 3,809,198 | 5/1974 | Mori | 192/211 X |
| 4,156,481 | 5/1979 | Ishida et al. | |
| 4,549,642 | 10/1985 | Loizeau | 192/211 X |
| 5,101,952 | 4/1992 | Saeki et al. | 192/211 |

*Primary Examiner*—Rodney H. Bonck
*Attorney, Agent, or Firm*—Collard & Roe, P.C.

[57] ABSTRACT

A clutch having a primary part and a secondary part for coupling together two coaxial rotating shafts including a driven shaft. The second part includes a driving disk, a trailing disk and tangential spring bodies forming a non-positive, engaging relationship between the driving disk and the trailing disk. At least one tangential spring body is a clamping body which is disposed within the second recess and abuts the radial edges of the first recess. The clamping body includes a cylinder, a piston slidably disposed within the cylinder to form a closed cylinder space. A cylindrical body made of an elastic material is disposed within the cylinder space. The cylindrical body completely occupies the cylinder space under initial axial compression of the piston whereby the cylindrical body absorbs further axial forces as an incompressible medium.

10 Claims, 2 Drawing Sheets

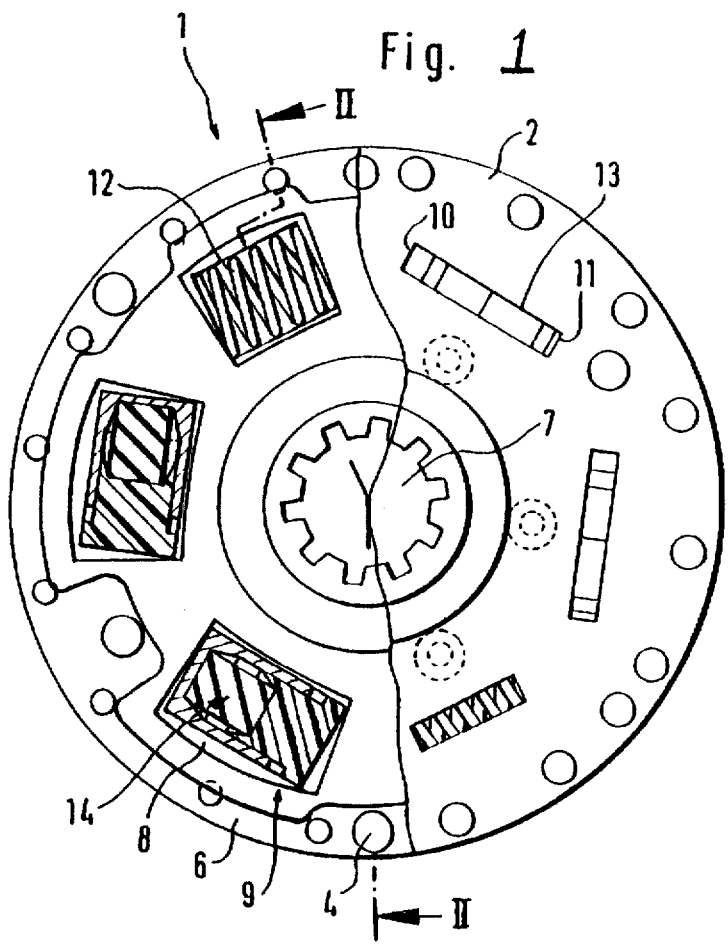
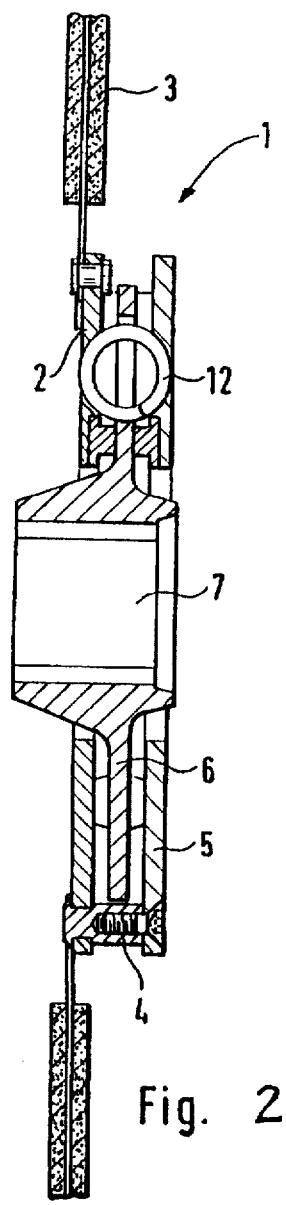
Fig. 1
Fig. 2
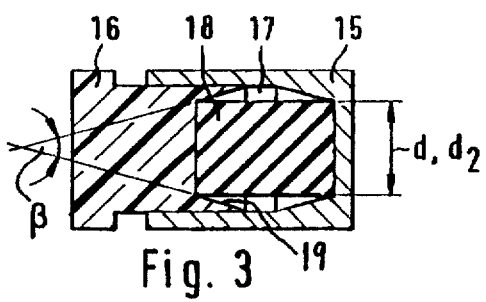
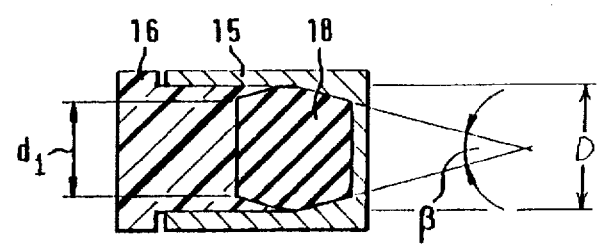

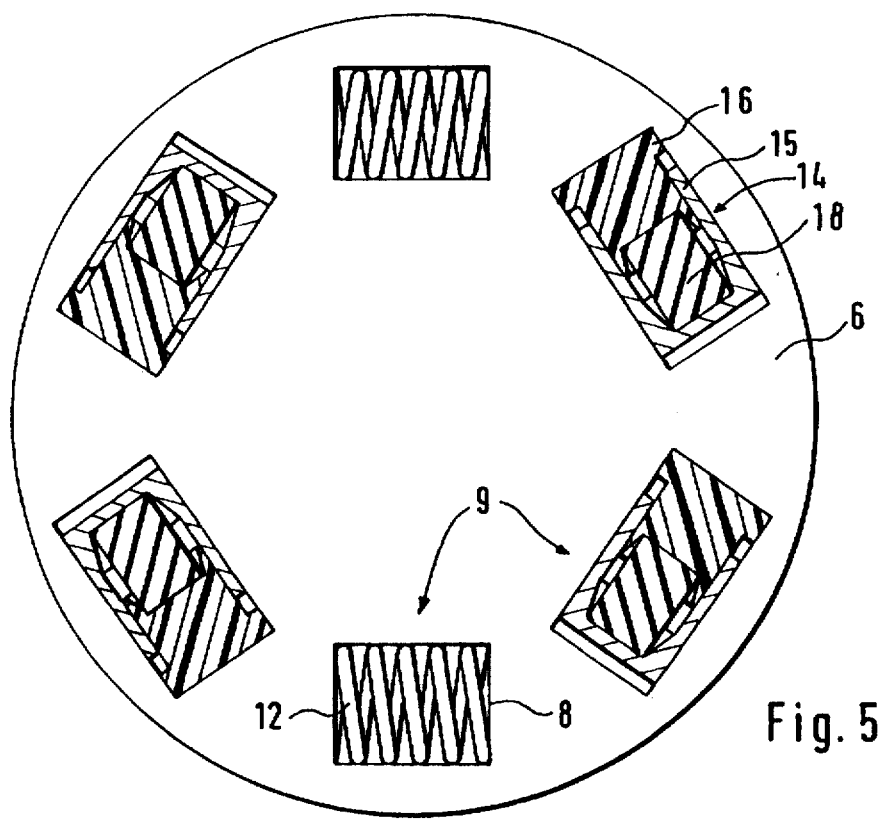
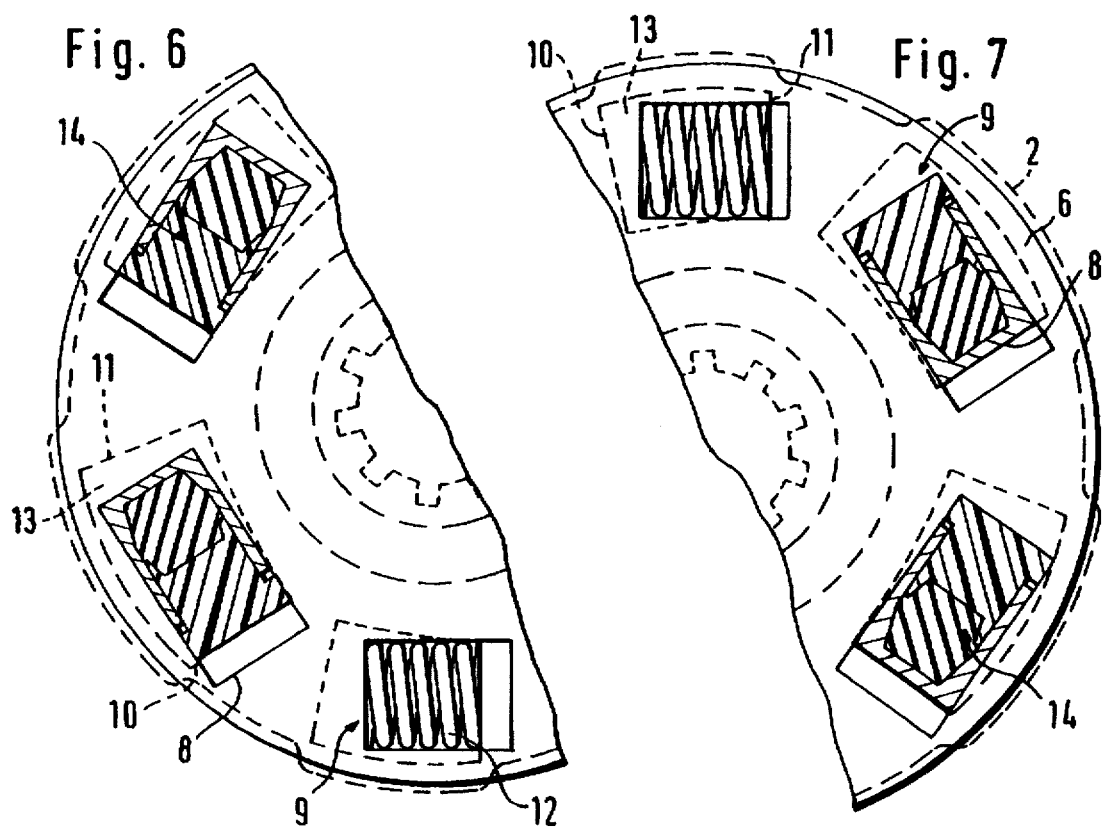

CLUTCH WITH TANGENTIAL SPRING BODIES

BACKGROUND OF THE INVENTION

1. Field of the Invention

The invention relates to a clutch with tangential spring bodies.

2. The Prior Art

Clutches are used to couple the motor to the drive wheels, and additionally to reduce torsional vibrations in the drive train, which are caused by variations in the running of the motor. Such torsional vibrations may weaken certain components, cause undesirable noise due to rattling of the transmission, develop load change vibrations, or create resounding of the body which effects the comfort of the passengers.

A substantial part of such phenomena is absorbed by known clutches. However, there still remains the problem of suppressing undesirable knocking noise when changing from idle to the transmission of torque, or in connection with other load change situations. The damping range of the known clutches does not cover the full load range or the complete load change range, i.e., the change between the transmission of very low forces and very high ones.

So as to avoid noises caused by very low forces during load changes within the idle range, clutches with tangential torsion springs acting as interior dampers have been developed, for example, for motor vehicles.

This includes, for example, rubber springs of the type specified in U.S. Pat. Nos. 2,964,930 and 4,156,481. In order to protect such springs from damage externally, they are accommodated in a cylinder opposite a piston acting on the rubber spring. The rubber bodies only act as rubber springs which are provided with sufficient space in order to yield when a pressure load occurs. Such yielding takes place either through a center bore or through a center constriction of the rubber body. The last phase of compression results in a higher absorption of force. However, such absorption is not adequate because the bodies do not adequately provide low damping in the presence of low forces, or very high damping in the presence of high forces which may resonate with the torsional vibrations.

SUMMARY OF THE INVENTION

It is therefore an object of the present invention to overcome the drawbacks of the prior art and to provide a simply-constructed clutch which provides a greater range of damping.

The clamping bodies according to the invention use the cylindrical body similar to hydraulic fluid which, under axial deformation or compression, fully occupies the closed space within the cylinder. The load can be increased approximately ten times more than with conventional spring bodies. An almost linear spring response is obtained initially followed by a progressively-increasing response, leading to nonpositive coupling of the trailing disk with the driving disk.

The clutch has a primary part and a secondary part for coupling together two coaxial rotating shafts including a driven shaft. The secondary part includes a driving disk, including a first recess with radial edges, for coupling to the primary part. A trailing disk, including a second recess, is rotatable relative to the driving disk and rigidly connected to the driven shaft. A plurality of tangential spring bodies form a nonpositive engaging relationship between the driving disk and the trailing disk. At least one tangential spring body is a clamping body disposed within the second recess and abutting the radial edges of the first recess. The clamping body comprises a cylinder having an inside diameter D, a piston slidably disposed within the cylinder in an axial direction to form a closed cylinder space, and a cylindrical body, made of elastic plastic material, disposed within the cylinder space and having a diameter d smaller than the inside diameter D. Wherein the cylindrical body is dimensioned to completely occupy the cylinder space upon initial axial compression of the piston whereby the cylindrical body absorbs further axial forces as an incompressible medium.

The piston includes a front side which faces the cylindrical body and has a frustoconical shape with a small end having a diameter $d_1$ equal to the diameter d of the cylindrical body and a large end with a diameter slightly smaller than diameter D of the cylinder. The cylinder has a frustoconical shape tapering inwardly toward the cylindrical body to a diameter $d_2$ equal to diameter d. The frustoconical shape of the cylinder and the piston both have a cone angle of approximately 20°.

The cylindrical body is made of rubber. The ratio between diameter d and diameter D is a measure of a spring characteristic of the clamping body. The piston has a lower modulus of elasticity than the cylinder. The piston is made of plastic. Half of the tangential spring bodies comprise clamping bodies. The spring bodies are installed so that the spring bodies engage the driving disk upon rotation of said driving disk with respect to said trailing disk.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a top plan view of a secondary part of a clutch according to the invention;

FIG. 2 is a cross-sectional view through the secondary part taken along the line II—II from FIG. 1;

FIG. 3 is a longitudinal sectional view through a clamping body in the relieved condition;

FIG. 4 is a longitudinal sectional view through a clamping body in the loaded condition;

FIG. 5 is a top plan view of a trailing disk of a clutch according to the invention, with clamping bodies and spring elements;

FIG. 6 is a fragmentary top plan view of a clutch with clamping bodies and spring elements loaded by thrust; and FIG. 7 is another fragmentary top plan view of a clutch with clamping bodies and spring elements loaded by tensile force.

DETAILED DESCRIPTION OF THE PREFERRED EMBODIMENT

Referring now in detail to the drawings, and in particular FIGS. 1 and 2, there is shown a secondary part 1 of a clutch according to the invention which includes a driving disk 2 having friction facing elements 3 on its outer circumference. Friction facing elements 3 are engaged on both sides, like pliers, by the clutch flanges of a two-part primary part (not shown).

Driving disk 2 is rigidly joined with a flange 5 by means of rivets or screws 4. A trailing disk 6 is mounted on a driven shaft 7 between flange 5 and driving disk 2 and is rotatable relative to driving disk 2. Trailing disk 6 has cage-like recesses 8 regularly or irregularly distributed across its circumference, for receiving tangential spring bodies 9. Tangential spring bodies 9 are also supported against radial edges 10 and 11 of recesses 13 of driving disk 2 and flange 5. Tangential spring bodies 9 are movable relative to driving disk 2 and flange 5, and are compressible. Recesses 13 in driving disk 2 and flange 5, have an angular range, in the circumferential direction, wider than recesses 8 in trailing disk 6.

Certain spring bodies 9 may be designed in the known way as spring elements in the form of torsion pressure springs 12, which are inserted in the cage-like recesses 8 of trailing disk 6 and project into recesses 13 of driving disk 2. However, some or all of the spring bodies 9 may be designed in the form of clamping bodies 14 according to the invention, as shown in FIGS. 3 and 4 in the relieved and the loaded condition, respectively.

Each clamping body 14 consists of a cylinder 15 and a piston 16. A cylinder space 17 is filled with a body 18 consisting of an elastomer, elastic material or an elastic plastic material, for example rubber, styrene-butadiene rubber, neoprene rubber, butyl rubber, nitrile rubber, polybutadiene rubber, polyisoprene rubber, ethylene-propylene rubber or natural rubber. Body 18 is cylindrical in the resting condition. The bore of cylinder 15 is conically tapered at its bottom end down to a diameter $d_2$ that is equal to a diameter d of cylindrical body 18.

The piston 16 has a conical depression 19 with a cone angle β of about 20°. The small end of conical depression 19 has a diameter $d_1$ which is equal to diameter d of cylindrical body 18. Advantageously, piston 16 consists of a material having a modulus of elasticity lower than cylinder 15, for example a plastic material.

When cylindrical body 18 is compressed, the marginal lip of piston 16, which surrounds depression 19, is firmly pressed against the inside wall of cylinder 15 and acts as a seal. At the same time, cylindrical body 15 deforms and behaves like a hydraulic fluid completely occupying cylinder space 17 and taking on the shape of a drum as shown in FIG. 4. At this point, very high forces can be absorbed by clamping body 14.

FIG. 5 shows a trailing disk 6 of a clutch with spring bodies 9, which are alternately designed as torsion springs 12 and clamping bodies 14. Modified characteristics can be obtained in this way. Such characteristics, furthermore, are dependent upon the diameter d of cylindrical body 18 and diameter D of clamping bodies 14.

FIGS. 6 and 7 show a clutch according to the invention loaded by tensile force and thrust in each case. When loaded by tensile force, the rearward—in the direction of rotation— edge 10 of each recess 13 of driving disk 2 engages the rearward end of piston 16 of torsion spring 12, and compresses cylindrical body 18 until the latter terminates the relative movement of piston 16 and cylinder 15. In the event of thrust load, the front radial edge 11 of each recess 13 of driving disk 2 and flange 5 engage the front side of the respective spring bodies 9. The clutch according to the invention is particularly suitable for torsional vibration dampers, damped friction disks in clutches, and clutches for connecting two shafts with an elastic coupling.

Accordingly, while only a single embodiment of the present invention has been shown and described, it is obvious that many changes and modifications may be made thereunto without departing from the spirit and scope of the invention.

What is claimed is:

1. A clutch having a primary part and a secondary part for coupling together two coaxial rotating shafts including a driven shaft, wherein the secondary part comprising:

a driving disk, including a first recess with radial edges, for coupling to the primary part;

a trailing disk, including a second recess, partially rotatable relative to said driving disk and adapted to be rigidly connected to the driven shaft; and a plurality of tangential spring bodies forming a non-positive engaging relationship between said driving disk and said trailing disk, at least one tangential spring body is a clamping body disposed within the second recess and abutting said radial edges of the first recess, said clamping body comprising:

a cylinder having an inside diameter (D);

a piston slidably disposed within said cylinder in an axial direction to form a closed cylinder space; and a cylindrical body, made of an elastic plastic material, disposed within the cylinder space and having a diameter (d) smaller than the inside diameter (D), wherein said cylindrical body is dimensioned to completely occupy the cylinder space upon initial axial compression of said piston whereby said cylindrical body absorbs further axial forces as an incompressible medium.

2. The clutch according to claim 1, wherein said piston includes a front side which faces said cylindrical body and has a frustoconical shape with a small end having a diameter ($d_1$) equal to the diameter (d) of said cylindrical body and a large end with a diameter slightly smaller than diameter (D) of said cylinder.

3. The clutch according to claim 2, wherein said cylinder has a frustoconical shape tapering inwardly toward said cylindrical body to a diameter ($d_2$) equal to diameter (d) of the cylindrical body.

4. The clutch according to claim 3, wherein the frustoconical shape of said cylinder and said piston both have a cone angle of approximately 20°.

5. The clutch according to claim 1, wherein said cylindrical body is made of rubber.

6. The clutch according claim 1, wherein a ratio between diameter (d) of the cylindrical body and inside diameter (D) of the cylinder is a measure of a spring characteristic of said clamping body.

7. The clutch according to claim 1, wherein said piston has a lower modulus of elasticity than said cylinder.

8. The clutch according to claim 7, wherein said piston is made of plastic.

9. The clutch according claim 1, wherein half of said tangential spring bodies comprise clamping bodies.

10. The clutch according claim 1, wherein said spring bodies are installed so that said spring bodies engage said driving disk upon rotation of said driving disk with respect to said trailing disk.

* * * * *